(12) United States Patent
Heo

(10) Patent No.: US 9,317,163 B2
(45) Date of Patent: Apr. 19, 2016

(54) SIGNAL PROCESSING CIRCUIT OF A TOUCH SCREEN

(71) Applicant: DONGBU HITEK CO., LTD., Seoul (KR)

(72) Inventor: Woon Hyung Heo, Asan-si (KR)

(73) Assignee: Dongbu Hitek Co., LTD., Seoul (KR)

( * ) Notice: Subject to any disclaimer, the term of this patent is extended or adjusted under 35 U.S.C. 154(b) by 495 days.

(21) Appl. No.: 13/832,015

(22) Filed: Mar. 15, 2013

(65) Prior Publication Data

US 2014/0247243 A1 Sep. 4, 2014

(30) Foreign Application Priority Data

Mar. 4, 2013 (KR) .................. 10-2013-0023052

(51) Int. Cl.
| | | |
|---|---|---|
| G06F 3/045 | (2006.01) | |
| G06F 3/044 | (2006.01) | |
| G06F 3/041 | (2006.01) | |
| G02F 1/1345 | (2006.01) | |

(52) U.S. Cl.
CPC ............ *G06F 3/044* (2013.01); *G02F 1/13452* (2013.01); *G06F 3/0412* (2013.01); *G06F 3/0418* (2013.01)

(58) Field of Classification Search
CPC .... G06F 3/0412; G06F 3/044; G02F 1/13452
USPC ....................................................... 345/174
See application file for complete search history.

(56) References Cited

U.S. PATENT DOCUMENTS

| | | | |
|---|---|---|---|
| 8,736,573 B2 | 5/2014 | Byun et al. | |
| 2011/0193817 A1 | 8/2011 | Byun et al. | |
| 2011/0273400 A1* | 11/2011 | Kwon et al. | 345/174 |
| 2012/0001859 A1 | 1/2012 | Kim et al. | |
| 2012/0293455 A1* | 11/2012 | Shen et al. | 345/174 |
| 2013/0162586 A1* | 6/2013 | Erdogan et al. | 345/174 |
| 2013/0229224 A1* | 9/2013 | Ho et al. | 327/517 |

FOREIGN PATENT DOCUMENTS

| | | |
|---|---|---|
| KR | 1020110091380 A | 11/2011 |
| KR | 1020120002891 A | 9/2012 |

OTHER PUBLICATIONS

Office Action dated Jul. 31, 2014 from the Korean Intellectual Property Office in corresponding Korean Patent Application No. 10-2013-0023052; 3 pages.

(Continued)

*Primary Examiner* — Chanh Nguyen
*Assistant Examiner* — Yuzhen Shen
(74) *Attorney, Agent, or Firm* — Andrew D. Fortney; Central California IP Group, P.C.

(57) ABSTRACT

A signal processing circuit of a touch screen panel is provided. A signal processing circuit can include a plurality of driving lines and sensing lines intersecting on the touch screen panel, a plurality of sensing channels connected to the sensing lines respectively and configured to detect whether a touch is performed by sensing mutual capacitance on intersecting nodes of the driving lines and the sensing lines, a distortion detection unit configured to detect whether distortion due to noise occurs on the basis of output voltages of the sensing channels, and a control unit configured to operate switches to alternate the circuit between a distortion mode and a normal mode, depending on whether noise is detected.

16 Claims, 8 Drawing Sheets

(56) References Cited

OTHER PUBLICATIONS

English translation of Korean Patent Abstract; "Method and Apparatus for Compensating Noise in a Touch Panel Including a Touch Controller"; Publication No. 1020110091380 A; Publication date: Nov. 8, 2011.

English translation of Korean Patent Abstract; "Touch Screen Device for Detecting Noise Capable of Using External Noise as an Indicator for an Operation of a Touch Panel and a Control Method Using the Same"; Publication No. 1020120002891 A; Publication date: Sep. 1, 2012.

* cited by examiner

SIGNAL PROCESSING CIRCUIT OF A TOUCH SCREEN

CROSS-REFERENCE TO RELATED APPLICATION

This application claims the benefit under 35 U.S.C. §119 of Korean Patent Application No. 10-2013-0023052, filed Mar. 4, 2013, which is hereby incorporated by reference in its entirety.

BACKGROUND

An input operation can be performed on a touch screen display device by touching certain points on the device with a stylus pen or a finger. The touch screen display device is provided with a plurality of touch sensing elements for detecting points touched by a user in addition to a plurality of pixels for displaying images.

A drive signal and a data signal are applied to each pixel, and each touch-sensing element senses a touch of the user to output a sensing signal according thereto. To this end, the touch screen display device is provided with a drive signal driving unit and a data signal driving unit for applying the drive signal and the data signal respectively, and a sensing line signal processing circuit for processing a signal outputted from each touch-sensing element to a sensing line.

FIG. 1 is a diagram illustrating a related art sensing line signal processing circuit of a touch screen. The sensing line signal processing circuit is provided with sensing read circuit units 10A to 10N, each of which has a sensor capacitor $C_{S,1}$, a pre-charge switch PC, a readout switch RO, an integrator 11 (analog sensing channel), a switch unit 20, and an A/D converter 30.

The sensor capacitor $C_{S,1}$ is one of the capacitors connected to a plurality of sensing lines arranged in one direction, e.g., vertical direction, on a touch screen panel. $C_{p,1}$ is a parasitic capacitor disposed between a pad adjacent to the sensor capacitor $C_{S,1}$ and a ground terminal.

In a pre-charge mode, the pre-charge switch PC is turned on for a certain period of time so that a power supply voltage VDD is pre-charged to the sensor capacitor $C_{S,1}$ through the pre-charge switch PC.

Thereafter, the readout switch RO is turned on for a certain period of time in a readout mode so that the voltage charged in the sensor capacitor $C_{S,1}$ is transferred to the integrator 11 through the readout switch RO.

However, when the sensor capacitor $C_{S,1}$ is touched by a user on the touch screen panel, a gap between electrode plates of the capacitor narrows, causing a variation in capacitance. Therefore, the voltage transferred from the sensor capacitor $C_{S,1}$ to the integrator 11 decreases.

The integrator 11 integrates an input voltage and generates a touch sensing output voltage $V_{OUT1}$ according thereto. Here, the touch sensing output voltage $V_{OUT1}$ of the integrator 11 corresponds to a value obtained by dividing an amount of input charges by a capacitance value of a feedback capacitor $C_{FB}$. That is, an integral value of a sensing line current is an amount of output charges.

According to the related art, as described above, the voltage of the sensor capacitor $C_{S,1}$ connected to a single touch line is compared to a reference voltage Vref in an operational amplifier OP of the integrator 11 so as to determine the touch sensing output voltage $V_{OUT1}$ according to a result of the comparison. That is, an absolute value comparison scheme is applied.

Through the above-mentioned processes, the touch sensing output voltage $V_{OUT1}$ for a single touch line is generated in a single sensing read circuit unit, e.g., the sensing read circuit unit 10A, and touch sensing output voltages Vout2 to Voutn for the other touch lines are generated in the sensing read circuit units 10B to 10N in the same manner.

The switch unit 20 is provided with switches SW1 to SWn, the number of which corresponds to that of the sensing read circuit units 10A to 10N. By sequentially turning on the switches, the touch sensing output voltages Vout2 to Voutn outputted from the sensing read circuit units 10A to 10N are sequentially transferred to the A/D converter 30. The A/D converter 30 converts the inputted analog signals to digital signals, and outputs the digital signals.

A system control unit (not illustrated) recognizes a vertical coordinate of the touch point on the touch screen panel on the basis of the digital signals outputted from the A/D converter 30, and recognizes a horizontal coordinate on the basis of a signal detected through a drive line or an additionally arranged horizontal line to thereby determine the vertical and horizontal coordinates of the touch point.

For instance, in the case where 100 drive lines and 100 sensing lines are arranged on the touch screen panel, when a changed vertical coordinate signal is outputted from the sensing read circuit unit connected to a 30th sensing line and a 50th drive line signal is applied, the X and Y coordinates are respectively 50 and 30. That is, the intersecting point of the 50th drive line and the 30th sensing line is determined to be a touch region.

However, the circuit according to the related art is not stably operated if noise occurs when a touch operation is performed. FIG. 2 is a graph illustrating that the output voltage Vout is distorted when a large amount of noise is introduced at the time of touch input.

When a noise is introduced at the time of touch input, an output of the operational amplifier connected to the signal sensing line can be outside a normal operation range. Therefore, an output waveform is distorted, and it may be impossible to distinguish a touch.

In this case, in order to inhibit the distortion of the output of the operational amplifier, the capacitance value of the feedback capacitor $C_{FB}$ in the analog sensing channel may be increased or an analog filter may be used. However, these methods cause an increase in a circuit area and require additional capacitors, increasing cost and power consumption.

BRIEF SUMMARY

Embodiments of the subject invention provide a signal processing circuit of a touch screen for sensing touch input from a user and methods of manufacturing the same. A signal processing circuit can increase capacitance of a sensing channel when noise is introduced to a touch screen sensor circuit for sensing the touch input from the user.

Embodiments of the subject invention also provide a circuit, and methods of fabricating the same, that does not require an additional capacitor for increasing capacitance by allowing channels to share capacitance by controlling switches of analog sensing channels.

In an embodiment, a signal processing circuit of a touch screen panel can include: a plurality of driving lines and a plurality of sensing lines intersecting on the touch screen panel; a plurality of sensing channels connected to the sensing lines, respectively, in a normal mode and configured to detect whether a touch is performed by sensing mutual capacitance on intersecting nodes of the driving lines and the sensing lines, wherein each sensing unit comprises a capacitor and a plurality of sensing channel switches; a distortion detection unit configured to detect whether distortion due to noise occurs on the basis of output voltages of the sensing channels; and a control unit configured to operate the sensing channel switches. The plurality of sensing channels can include: a plurality of odd sensing channels comprising a first sensing channel closest to an edge region of the signal processing circuit and further comprising alternating sensing channels starting from the first sensing channel; and a plurality of even sensing channels comprising a second sensing channel adjacent to the first sensing channel and further comprising alternating sensing channels starting from the second sensing channel, such that each odd sensing channel is adjacent to at least one even sensing channel and not adjacent to any other odd sensing channel, and each even sensing channel is adjacent to at least one odd sensing channel and not adjacent to any other even sensing channel.

The signal processing circuit can be configured such that, when the distortion unit determines that distortion due to noise has occurred, the signal processing circuit can operate in a distortion mode, and the signal processing circuit can further be configured such that, when the distortion unit does not determine that distortion due to noise has occurred, the signal processing circuit can operate in the normal mode. A sensing channel in an off state can be disconnected from its respective sensing line, and, in the distortion mode, the control unit can operate the sensing channel switches to either turn an odd sensing channel to the off state or turn an even sensing channel to the off state, but not both. That is, the control unit can operate the sensing channel switches to either turn an odd sensing channel to the off state while no even sensing channel is in the off state or turn an even sensing channel to the off state while no odd sensing channel is in the off state. The control unit can also operate the sensing channel switches to connect in parallel the capacitor of the sensing channel in the off state to the capacitor of an adjacent sensing channel.

In a further embodiment, in the distortion mode, the control unit can operate the sensing channel switches to: either turn all odd sensing channels to the off state while no even channels are in the off state or turn all even sensing channels to the off state while no odd sensing channels are in the off state; and connect in parallel the capacitor of each sensing channel in an off state to the capacitor of an adjacent sensing channel.

In another embodiment, a method of detecting a touch of a touch screen panel can include: providing a signal processing circuit of the touch screen panel; determining, by the distortion detection unit of the signal processing circuit, whether noise is present based on output voltages of sensing channels of the signal processing circuit; and if a noise voltage is present, operating in a distortion mode to detect a touch on the touch screen panel, while if a noise voltage is not present, operating in a normal mode to detect a touch on the touch screen panel. The signal processing unit can be as described in any of the preceding paragraphs.

DETAILED DESCRIPTION

Reference will now be made in detail to the embodiments of the present disclosure, examples of which are illustrated in the accompanying drawings.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present.

Figure 1:
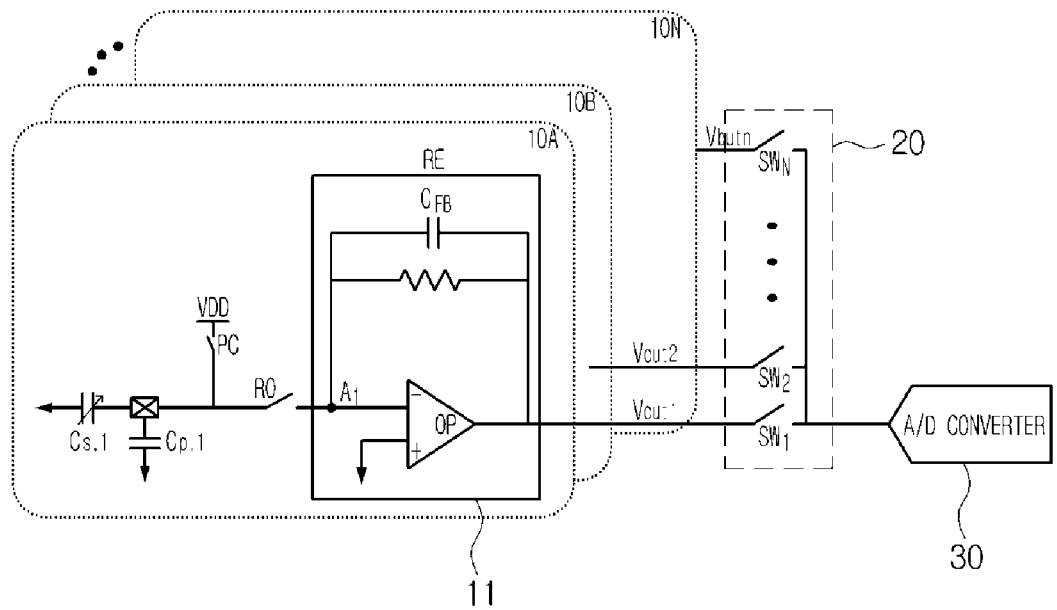
FIG. 1 is a diagram of a related art sensing line signal processing circuit of a touch screen.
Figure 2:
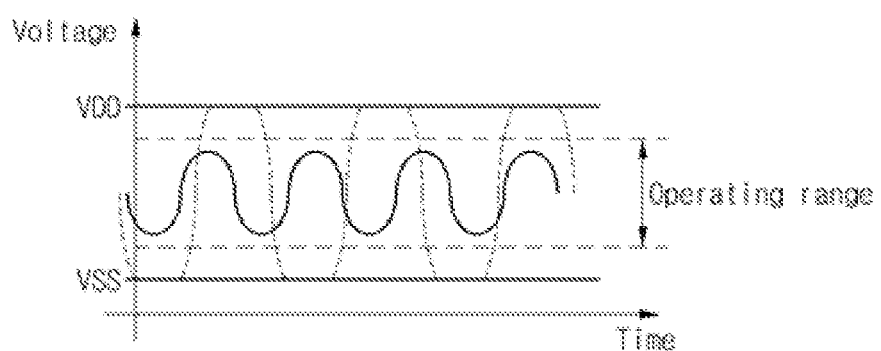
FIG. 2 is a diagram showing distortion due to noise in a sensing channel that is a signal processing circuit of a touch screen sensing line.
Figure 3:
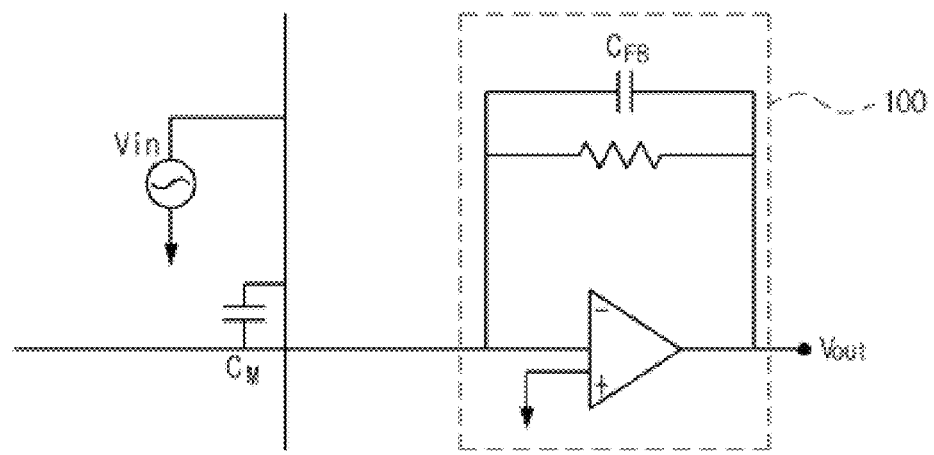
FIG. 3 is a diagram of a circuit according to an embodiment of the subject invention.

FIG. 3 is a diagram of a basic principle of an embodiment of the subject invention.

Referring to FIG. 3, the basic principle of an embodiment of the subject invention will be described.

When a touch screen is touched (e.g., by a hand of a user or by a stylus pen), a value of a mutual capacitor $C_M$ can decrease, and the touched location can be recognized by sensing the value of the mutual capacitor $C_M$. Sensing channels can be respectively connected to corresponding sensing lines, and it can be determined whether a touch is performed by sensing mutual capacitance on intersecting nodes of the sensing lines and driving lines.

A voltage $V_{OUT}$ output from a sensing channel of a sensing line signal, including an operation amplifier (op-amp), a resistor, and a capacitor $C_{FB}$, can be determined by a ratio between $C_M$ and $C_{FB}$, as shown in Equation 1.

$$V_{OUT} = V_{IN} \times \frac{C_M}{C_{FB}} \qquad \text{Equation 1}$$

As represented by Equation (1), $V_{OUT}$ is proportional to $C_M$ and is inversely proportional to $C_{FB}$. When a signal distorted due to noise is input to a sensing channel 100, an output of the operational amplifier of the sensing channel can be outside a normal operation range. Therefore, an output waveform of $V_{OUT}$ can be distorted and a touch may not be distinguished.

In this case, if a value of $C_{FB}$ is increased, a value of $V_{OUT}$ can be reduced to a value within a permissible range, and certain embodiments of the subject invention are based on the increase in the value of $C_{FB}$. That is, in order to recognize a touch location on a touch screen, $C_{FB}$ values of sensing channels for sensing signals transferred from sensing lines among drive lines and the sensing lines arranged in a matrix form can be selectively increased.

Hereinafter, a method of selectively increasing capacitance of sensing channels respectively connected to sensing lines, according to an embodiment of the subject invention, will be described.

Figure 4:
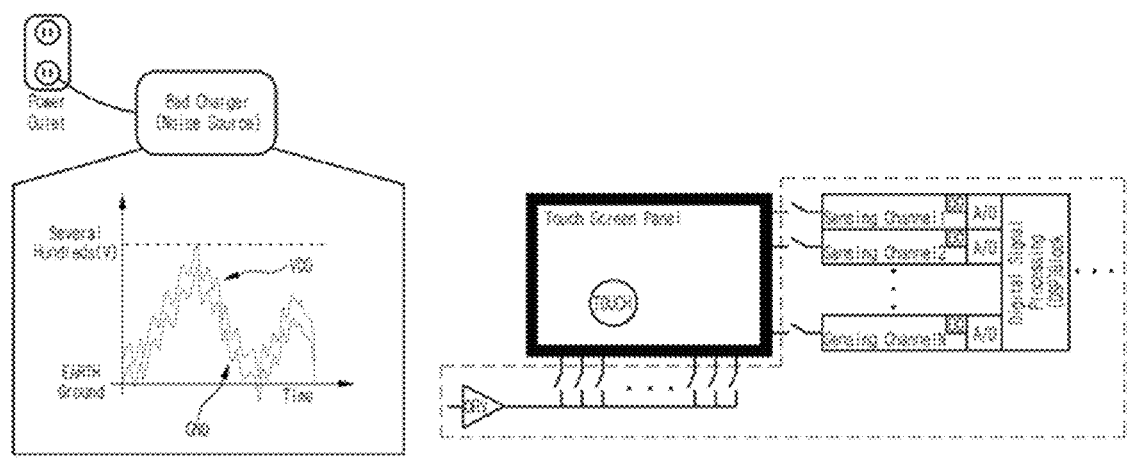
FIGS. 4 and 5 are diagrams of the case where noise is introduced to a touch screen circuit.
Figure 5:
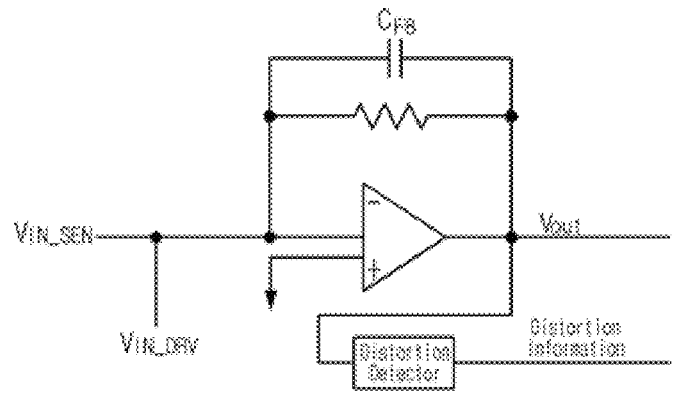

FIGS. 4 and 5 are diagrams of a case where noise is introduced to a touch screen circuit.

Referring to FIG. 4, noise can be introduced to a touch screen panel side due to various causes. For example, when a waveform of supply power for charging an electronic device having a touch screen is not uniform, a large amount of noise can be included in touch input from a user. For another example, when a touch is performed with a wet hand, or ambient light affects the touch, noise such as a rapid increase in a $C_M$ value can occur.

Referring to FIG. 5, in the case where noise is introduced to a touch screen panel, a distortion detector (DD) of a sensing channel, connected to a sensing line, can detect whether $V_{OUT}$ is outside a permissible range. Here, the distortion detector can serve as a comparator and can be implemented, for example, with an analog circuit or as firmware. A sensing channel connected to a sensing line can include the distortion detector operating like a comparator to detect an output that is outside a normal operation range.

By means of the distortion detector, when an output waveform of $V_{OUT}$ is distorted or is outside a normal operation range, a control unit (not illustrated) of a circuit can control a switch (e.g., a transistor) included in each sensing channel so that sensing channels can have selectively increased values of $C_{FB}$.

Figure 6:
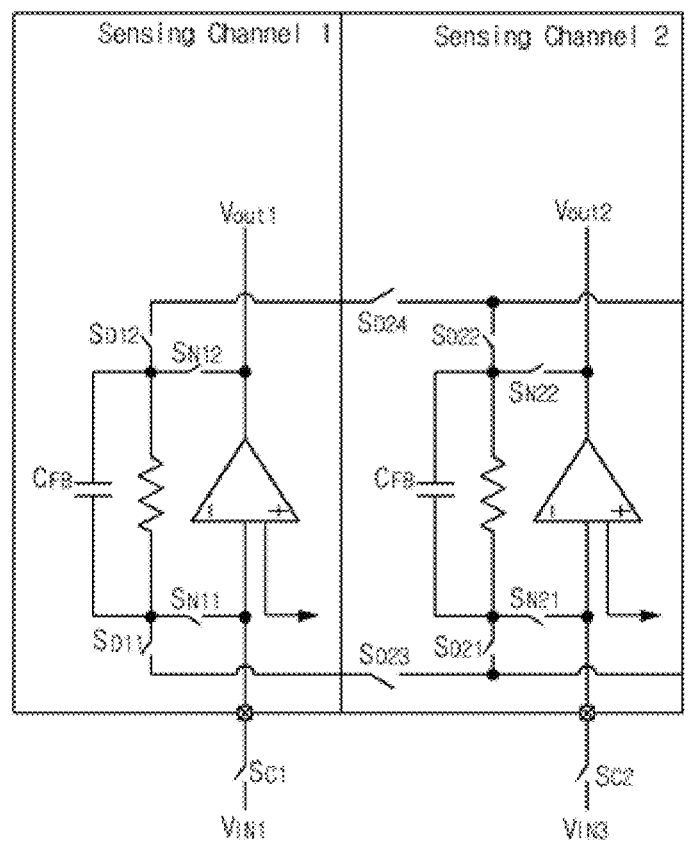
FIG. 6 is a diagram of a configuration of a sensing channel according to an embodiment of the subject invention.

FIG. 6 is a diagram of a configuration of a sensing channel according to an embodiment of the subject invention.

A sensing channel can distinguish a touch location on the basis of a signal transferred from a sensing line among drive lines and sensing lines arranged in a matrix form.

In an embodiment, when signal distortion due to noise occurs, in order to increase a $C_{FB}$ value of a sensing channel, a capacitor $C_{FB}$ of an adjacent sensing channel can be connected in parallel. Accordingly, recognition of a touch location can be performed through odd-column sensing lines or even-column sensing lines.

Referring to FIG. 6, a first sensing channel and a second sensing channel can be arranged adjacent to each other. The first sensing channel can be, for example, a channel circuit connected to an outermost sensing line, and the second sensing channel can be a second sensing channel circuit adjacent to the first sensing channel.

The first sensing channel can include an operation amplifier (op-amp) to which a voltage $V_{IN1}$ transferred from a first sensing line is input, a resistor connected in parallel to the operational amplifier, and a capacitor $C_{FB}$. Each sensing channel can includes a plurality of switches, and the quantity and locations of the switches illustrated in the drawings may be changed according to various embodiments of the subject invention.

Hereinafter, the terms "normal mode" and "distortion mode" will be used. In the distortion mode, a value of $C_{FB}$ in a sensing channel is increased when distortion of an output waveform of $V_{OUT}$ is detected. In the normal mode, all sensing channels respectively connected to sensing lines are operated. Therefore, in the distortion mode, odd sensing channels are operated, and then even sensing channels are operated.

In an embodiment, the first sensing channel can include a first normal mode switch $S_{N11}$ and a second normal mode switch $S_{N12}$ that can be turned on in the normal mode. The first sensing channel can include a plurality of distortion mode switches $S_{D11}$ and $S_{D12}$ that can be operated when noise is introduced to the sensing channel and an output waveform of $V_{OUT}$ outside a normal range. The first sensing channel can also include a channel switch $S_{C1}$ arranged on the first sensing line of a touch screen so that a signal transferred from the first sensing line can be selectively transferred to the first sensing channel.

In an embodiment, the second sensing channel can include a first normal mode switch $S_{N21}$ and a second normal mode switch $S_{N22}$ that can be turned on in the normal mode. The second sensing channel can include a plurality of distortion mode switches $S_{D21}$ to $S_{D24}$ that can be selectively turned on/off in the distortion mode of the sensing channel. The second sensing channel can also include a channel switch $S_{C2}$ arranged on a second sensing line of the touch screen so that a signal transferred from the second sensing line can be selectively transferred to the second sensing channel.

Figure 7:
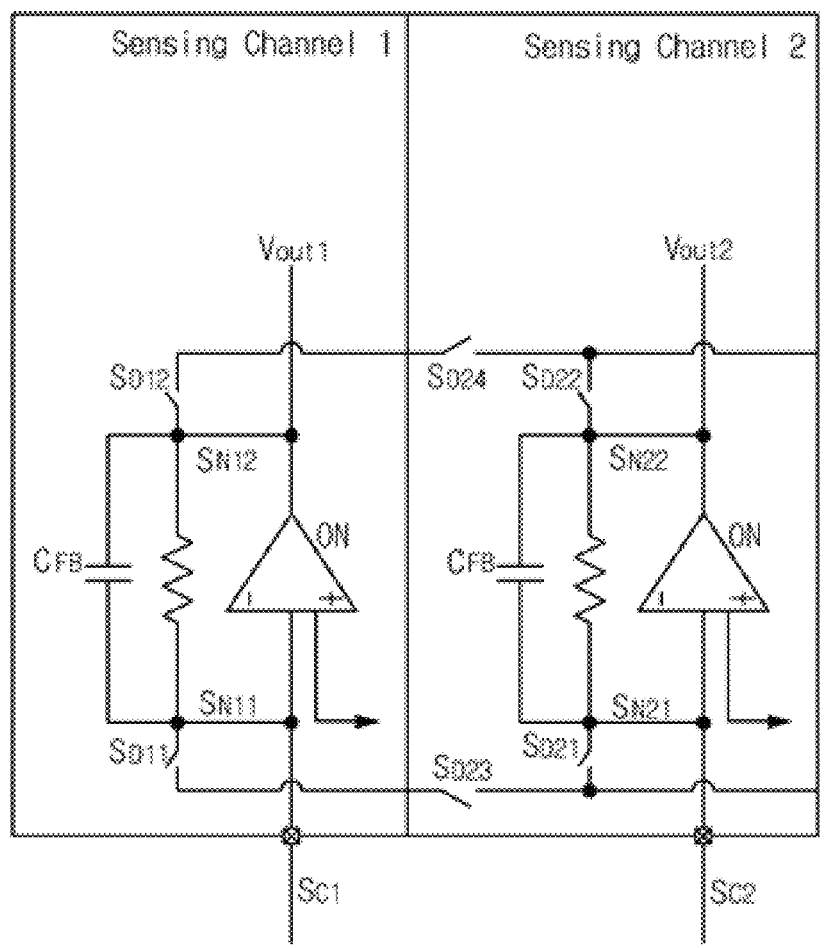
FIG. 7 is a diagram of operations of sensing channels in a normal mode, according to an embodiment of the subject invention.

FIG. 7 is a diagram for describing operations of sensing channels in the normal mode, according to an embodiment of the subject invention.

Referring to FIG. 7, operations of turning the switches on and/or off in the normal modes of the first and second sensing channels are described.

As described above, the plurality of switches provided to each channel can include transistors, though embodiments are not limited thereto. A control unit of the touch screen device or a control means can control the turning on/off operations of the switches.

In the normal mode, a capacitance value of $C_{FB}$ can be sufficient for each sensing channel, and thus the sensing channels can be divided from each other. That is, the third distortion mode switch $S_{D23}$ and the fourth distortion mode switch $S_{D24}$ of the second sensing channel can be turned off. The third $S_{D23}$ and fourth $S_{D24}$ distortion mode switches and can serve to selectively connect the first sensing channel to the second sensing channel.

Both the first channel switch $S_{C1}$ and the second channel switch $S_{C2}$ can be turned on so that sensing line signals can be transferred to respective sensing channels.

The distortion mode switches $S_{D11}$, $S_{D12}$, $S_{D21}$, and $S_{D22}$ respectively connected to the sensing channels can be turned off so that the capacitors of the sensing channels do not influence each other. In this state, the voltages transferred through respective sensing lines can be within a permissible range of the operational amplifier of each sensing channel, and a touch location can be determined on the basis of the voltage values of the sensing channels.

When an output of the operational amplifier of each sensing channel is outside a normal operation range, the circuits can be operated in the normal mode.

Figure 8:
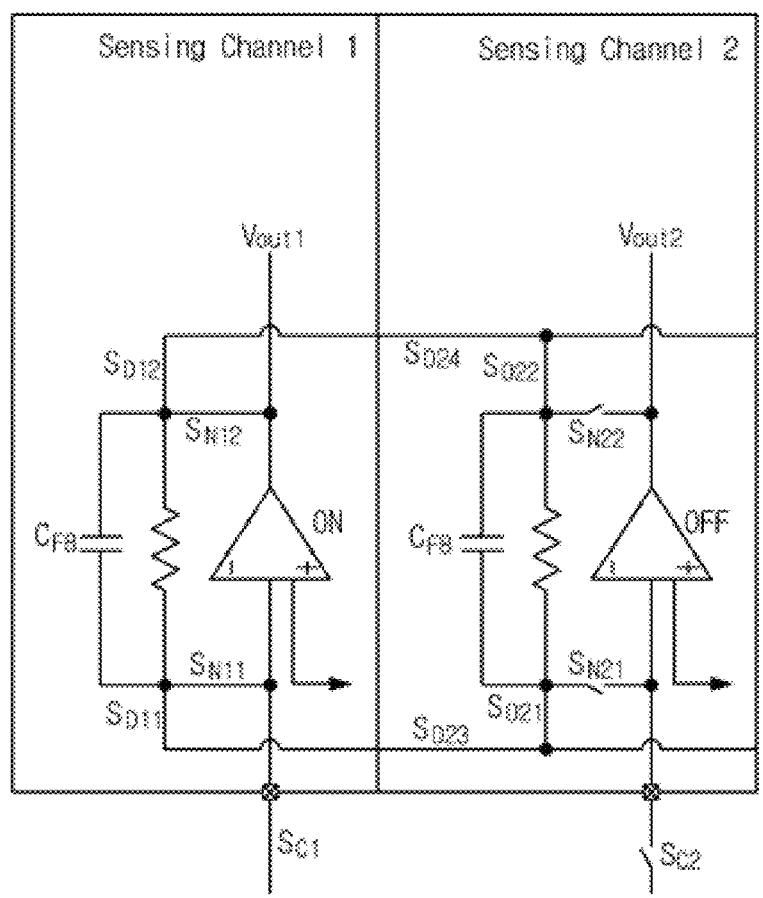
FIGS. 8 and 9 are diagrams of operations of sensing channels when distortion due to noise is detected, according to an embodiment of the subject invention.
Figure 9:
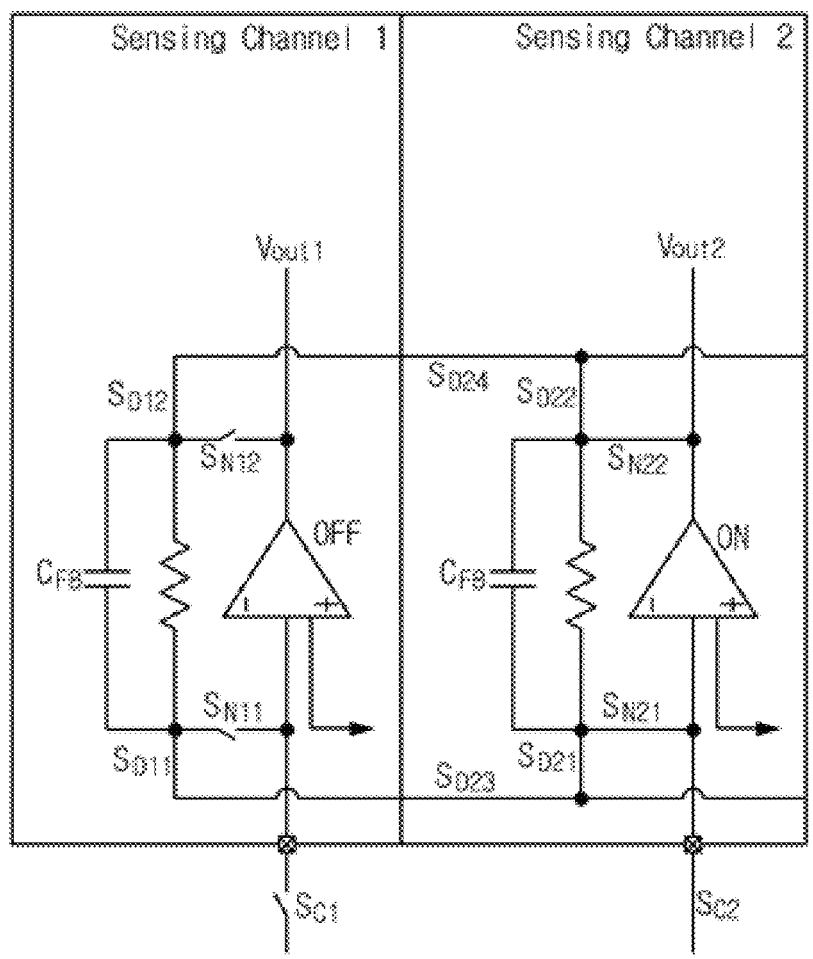

FIGS. 8 and 9 are diagrams for describing operations of sensing channels when distortion due to noise is detected, according to an embodiment of the subject invention.

In the distortion mode, each sensing channel can be selectively enabled (turned on) or disabled (turned off). A sensing channel can be enabled when the capacitor and the operational amplifier of the sensing channel are normally connected to each other. The enablement of a sensing channel can indicate that the operational amplifier and the capacitor of the sensing channel are disconnected from each other.

When a circuit is operated in the distortion mode according to an embodiment of the present invention, capacitance of an adjacent sensing channel can be used. Therefore, for signals of sensing lines for recognizing a touch, sensing lines of odd columns can be scanned and then sensing lines of even columns can be scanned. Alternatively, the sensing lines of the even columns can be scanned first, and then the sensing lines of the odd columns can subsequently be scanned.

FIG. 8 illustrates the case where signals transferred from the sensing lines of the odd column are detected first.

Referring to FIG. 8, the sensing channels of the odd columns including the first sensing channel can be operated, and the sensing channels of the even columns including the second sensing channel can be turned off.

Therefore, in the distortion mode of the circuit, only one of adjacent sensing channels is operated at a first timing. That is, at a given time, every other sensing channel is turned on and every other sensing channel is turned off. In comparison with the normal mode in which all sensing channels can be operated, recognition of a touch location may not be accurate. However, even though a signal is distorted due to noise, the touch location of a user can be roughly detected.

The distortion mode can be divided in a temporal sense into a first time period and a second time period. For example, the sensing channels of the odd columns can be enabled during the first time period. Then, the sensing channels of the even columns can be enabled during the second time period. In another embodiment, the sensing channels of the even columns can be enabled during the first time period, and the sensing channels of the odd columns can be enabled during the second time period.

When the odd columns (e.g., including the first sensing channel) are enabled, the first $S_{N11}$ and second $S_{N12}$ normal mode switches and can be turned on in the first sensing channel, and the first $S_{N12}$ and second $S_{D12}$ distortion mode switches and can also be turned on. The third $S_{D23}$ and fourth $S_{D24}$ distortion mode switches and of the second sensing channel can also turned be on so that the first and second sensing channels are connected to each other.

In order to turn off the operational amplifier of the second sensing channel, the first $S_{N21}$ and second $S_{N22}$ normal mode switches and of the second sensing channel can be turned off (e.g., open). The second channel switch $S_{C2}$ connected to the second sensing line can be turned off, and a voltage may not applied to the second sensing channel from the second sensing line.

In order to increase capacitance of the first sensing channel, the first $S_{D21}$ and second $S_{D22}$ distortion mode switches and of the second sensing channel can be turned on (e.g., closed) so that the capacitor of the second sensing channel is connected in parallel to the capacitor of the first sensing channel.

Accordingly, the first sensing channel can be turned on, and the second sensing channel can be turned off. Since the capacitance of the first sensing channel then becomes $2C_{FB}$, a value of $V_{OUT1}$ can be reduced even when signal distortion occurs due to noise.

At the second time period after a lapse of the first timing, the first sensing channel can be turned off and the second sensing channel can be turned on.

Referring to FIG. 9, the first channel switch $S_{C1}$ connected to the first sensing line can be turned off, and, in order to turn off the operational amplifier of the first sensing channel, both the first $S_{N11}$ and second $S_{N12}$ normal mode switches and of the first sensing channel can be turned off. The first $S_{D11}$ and second $S_{D12}$ distortion mode switches and of the first sensing channel can also be turned on so that the first sensing channel can be connected to the second sensing channel.

During the second time period, the first $S_{N21}$ and second $S_{N22}$ normal mode switches and of the second sensing channel can be turned on so that the operational amplifier of the second sensing channels can be turned on, and the first to fourth distortion mode switches $S_{D21}$ to $S_{D24}$ can also be turned on so that the capacitors can be connected to each other in parallel between the first and second sensing channels.

Therefore, at the second time period, the capacitance of the second sensing channel becomes $2C_{FB}$ to measure a voltage transferred from the second sensing line, and thus a value of $V_{OUT2}$ can be reduced by virtue of the increased capacitance even though signal distortion occurs.

When the distortion detector determines that noise is introduced, each switch can be turned on or off by the switch control means or control unit for controlling the switches included in each sensing channel. Through this operation, touch input of the sensing lines of the odd columns can be detected during the first time period (e.g., at the beginning of the first time period), and touch input of the sensing lines of the even columns can be detected during the second time period (e.g., at the beginning of the second time period).

Figure 10:
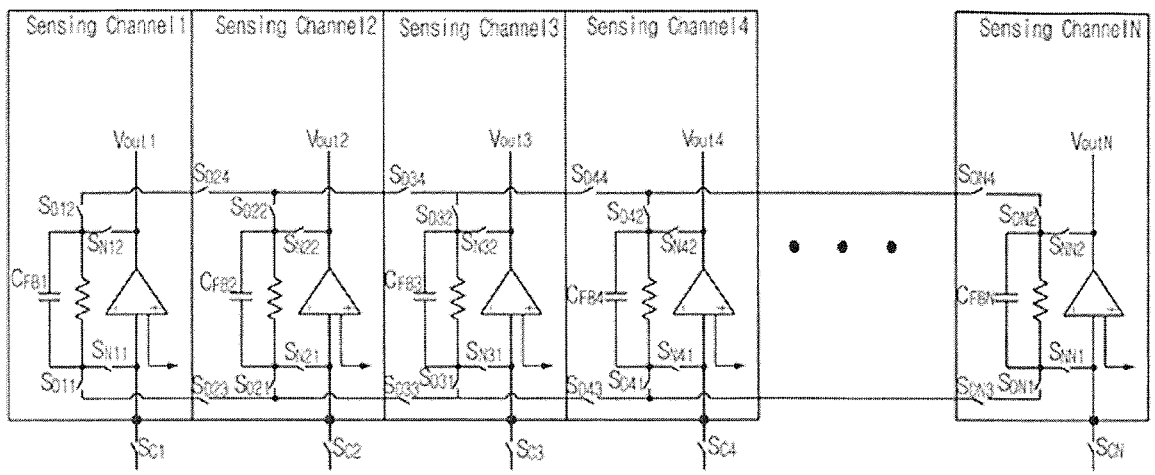
FIG. 10 is a diagram of a case where a great number of sensing channels are configured, according to an embodiment of the subject invention.
Figure 11:
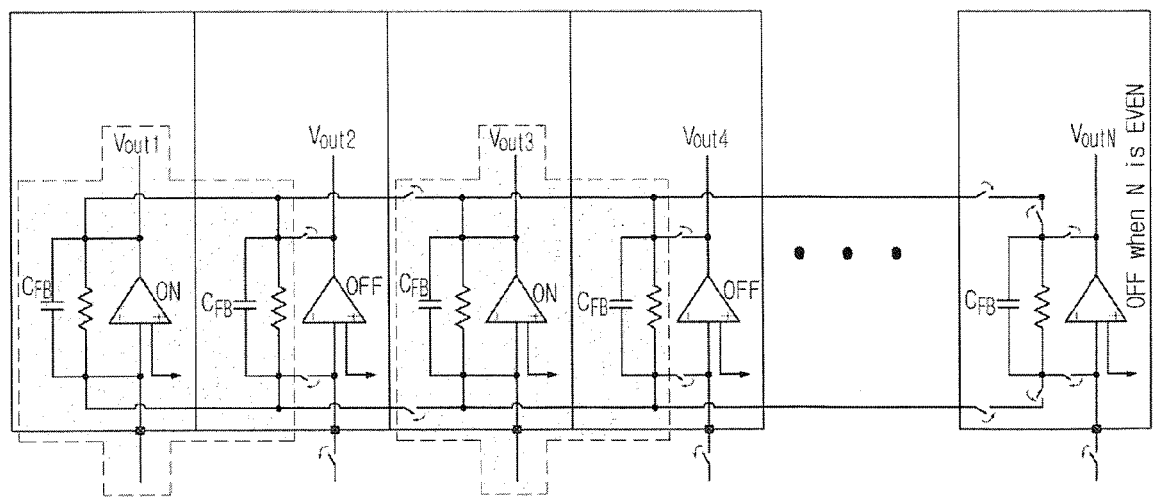
FIGS. 11 and 12 are diagrams of operations performed when distortion due to noise is detected in the circuit of FIG. 10.
Figure 12:
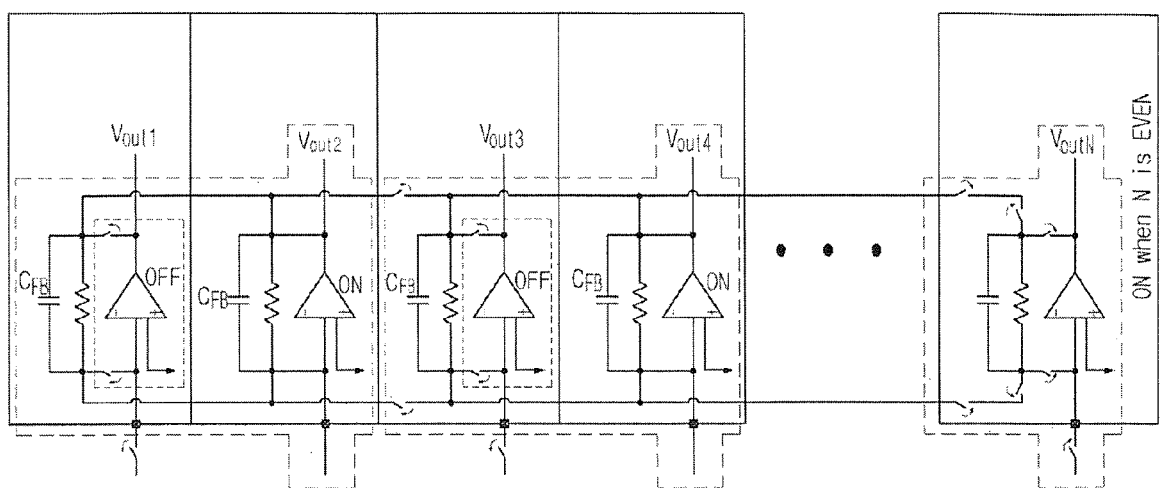

FIG. 10 is a diagram showing the case where a great number of sensing channels are configured according to an embodiment of the subject invention, and FIGS. 11 and 12 are diagrams for describing operations of the circuit of FIG. 10 when distortion due to noise is detected.

FIGS. 10 to 12 show more sensing channels than FIGS. 6 to 9, but the basic principle is the same. Thus, detailed descriptions of the sensing channels are discussed above and are not repeated here for the sake of brevity.

However, a circuit operation at the distortion mode is described. As described above, it is assumed that the sensing lines of the odd columns are sensed during the first time period (e.g., at the beginning of the first time period), and the sensing lines of the even columns are sensed during the second time period (e.g., at the beginning of the second time period). Though this configuration is discussed for exemplary purposes, embodiments are not limited thereto. For example, the sensing lines of the even columns can be sensed during the first time period, and the sensing lines of the odd columns can be sensed during the second time period.

During the first time period, a touch location can be detected on the basis of output voltages of the sensing channels of the odd columns, e.g., $V_{OUT1}$ and $V_{OUT3}$. To this end, the capacitor of the first sensing channel can be connected in parallel to the capacitor of the second sensing channel so that the capacitance is increased two times.

Likewise, the capacitor of the third sensing channel can be connected in parallel to the capacitor of the adjacent fourth sensing channel. Here, the capacitance sharing scheme between the first and second sensing channels has been described with reference to FIGS. 6 to 9. Thus, a relationship between the third and fourth sensing channels will now be described.

Although the relationship between the first and second sensing channels can be the same as that between the third and fourth sensing channels, in an embodiment, more distortion mode switches can be arranged in the third sensing channel since the first sensing channel is arranged at the leftmost side. For example, the third sensing channel can further include third $S_{D33}$ and fourth $S_{D34}$ distortion switches and for selectively releasing a connection to the second sensing channel. Though such a configuration is shown for exemplary purposes, more or less distortion switches can be included.

In an embodiment, the second and third sensing channels can share capacitance. Thus, distortion mode switches can be provided to additional locations not illustrated in the drawings.

Referring to FIG. 11, during the first time period, the third channel switch $S_{C3}$ can be turned on, and the fourth channel switch $S_{C4}$ can be turned off so that an output voltage of the third sensing line can be transferred to the third sensing channel. The first $S_{N31}$ and second $S_{N32}$ normal mode switches and can be turned on so that the third sensing channel can be operated, and the third $S_{D43}$ and fourth $S_{D44}$ distortion mode switches and can be turned on so that the capacitor of the fourth sensing channel can be connected in parallel to the third sensing channel.

In order to turn off the operational amplifier of the fourth sensing channel, the first $S_{N41}$ and second $S_{N42}$ normal mode switches and of the fourth sensing channel can be turned off.

After a lapse of a certain period of time of the first time period, touch location detection can be performed on the fourth sensing line through a turning-on operation of the fourth sensing channel. Since the sensing channels of the even columns can be turned on during the second time period (e.g., at the beginning of the second time period), the second and sixth sensing channels can be turned on (see, e.g., FIG. 12).

According to an embodiment, a circuit can be operated in the distortion mode when signal distortion occurs due to noise and this distortion causes deviation from a normal operation range of the operational amplifier of the sensing channel. That is, the sensing channels can share capacitance, and output voltages of the sensing channels can be reduced. Therefore, a touch location can be detected through the sensing lines of the odd columns or the sensing lines of the even columns.

By virtue of such a structure, it is not necessary to provide an additional capacitor for the signal distortion due to noise, and thus the cost of manufacturing a circuit of a touch screen panel does not increase.

According to embodiments of the subject invention, capacitance between channels can be shared when noise is introduced and analog distortion occurs in a sensing channel, and operations can therefore be normally performed due to the increased capacitance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

What is claimed is:

1. A signal processing circuit of a touch screen panel, comprising:
   a plurality of driving lines and a plurality of sensing lines intersecting on the touch screen panel;
   a plurality of sensing channels connected to the sensing lines by channel switches, respectively, and configured to detect whether a touch is performed by sensing mutual capacitance on intersecting nodes of the driving lines and the sensing lines, wherein each sensing channel comprises a feedback capacitor, and the feedback capacitors of adjacent ones of the sensing channels are connected in parallel by distortion mode switches;
   a distortion detection unit configured to detect whether distortion due to noise occurs on the basis of output voltages of the sensing channels; and
   a control unit configured to operate the channel switches and the distortion mode switches,
   wherein the plurality of sensing channels comprises:
      a plurality of odd sensing channels comprising a first sensing channel closest to an edge region of the signal processing circuit and further comprising alternating sensing channels starting from the first sensing channel; and
      a plurality of even sensing channels comprising a second sensing channel adjacent to the first sensing channel and further comprising alternating sensing channels starting from the second sensing channel,
      such that each odd sensing channel is adjacent to at least one even sensing channel and not adjacent to any other odd sensing channel, and each even sensing channel is adjacent to at least one odd sensing channel and not adjacent to any other even sensing channel,
   wherein the signal processing circuit is configured such that, when the distortion detection unit determines that distortion due to noise has occurred, the signal processing circuit operates in a distortion mode,
   wherein the signal processing circuit is configured such that, when the distortion detection unit does not determine that distortion due to noise has occurred, the signal processing circuit operates in a normal mode,
   wherein a sensing channel in an off state is disconnected from its respective sensing line, and
   wherein, in the distortion mode, the control unit operates:
      the channel switches to either turn an odd sensing channel to the off state while no even sensing channel is in the off state or turn an even sensing channel to the off state while no odd sensing channel is in the off state; and
      the distortion mode switches to connect in parallel the feedback capacitor of the sensing channel in the off state to the feedback capacitor of an adjacent sensing channel.

2. The signal processing circuit according to claim 1, wherein, in the distortion mode, the control unit operates:
   the channel switches to either turn all odd sensing channels to the off state while no even channels are in the off state or turn all even sensing channels to the off state while no odd sensing channels are in the off state, and
   the distortion mode switches to connect in parallel the feedback capacitor of each sensing channel in an off state to the feedback capacitor of an adjacent sensing channel.

3. The signal processing circuit according to claim 1, wherein in the normal mode, the control unit operates:
   the channel switches such that no sensing channel is in the off state, and
   the distortion mode switches such that the feedback capacitor of each sensing channel is disconnected from all adjacent sensing channels.

4. The signal processing circuit according to claim 1, wherein the first sensing channel comprises a first operational amplifier, which is connected in parallel to the feedback capacitor of the first sensing channel in the normal mode,
   wherein the second sensing channel comprises a second operational amplifier, which is connected in parallel to the feedback capacitor of the second sensing channel in the normal mode, and wherein, in the distortion mode, the control unit operates the distortion mode switches such that the feedback capacitor of the first sensing channel is connected in parallel to the feedback capacitor of the second sensing channel.

5. The signal processing circuit according to claim 4, wherein, when the first sensing channel is in the off state, the feedback capacitor of the first sensing channel is disconnected from the first operational amplifier, and wherein, when the second sensing channel is in off state, the feedback capacitor of the second sensing channel is disconnected from the second operational amplifier.

6. The signal processing circuit according to claim 1, wherein, in the distortion mode, either the first sensing channel or the second sensing channel is in the off state while the other is not in the off state.

7. The signal processing circuit according to claim 1, wherein each sensing channel comprises an operational amplifier, which is connected in parallel to the feedback capacitor of its respective sensing channel in the normal mode.

8. The signal processing circuit according to claim 7, wherein, when a sensing channel is in the off state, the feedback capacitor of that sensing channel in the off state is disconnected from the operational amplifier of that sensing channel in the off state.

9. A method of detecting a touch of a touch screen panel, the method comprising:
  providing a signal processing circuit of the touch screen panel, the signal processing circuit comprising:
    a plurality of driving lines and a plurality of sensing lines intersecting on the touch screen panel;
    a plurality of sensing channels connected to the sensing lines by channel switches, respectively, and configured to detect whether a touch is performed by sensing mutual capacitance on intersecting nodes of the driving lines and the sensing lines, wherein each sensing channel comprises a feedback capacitor, and the feedback capacitors of adjacent ones of the sensing channels are connected in parallel by distortion mode switches;
    a distortion detection unit configured to detect whether distortion due to noise occurs on the basis of output voltages of the sensing channels; and
    a control unit configured to operate the channel switches and the distortion mode switches,
  wherein the plurality of sensing channels comprises:
    a plurality of odd sensing channels comprising a first sensing channel closest to an edge region of the signal processing circuit and further comprising alternating sensing channels starting from the first sensing channel; and
    a plurality of even sensing channels comprising a second sensing channel adjacent to the first sensing channel and further comprising alternating sensing channels starting from the second sensing channel, such that each odd sensing channel is adjacent to at least one even sensing channel and not adjacent to any other odd sensing channel, and each even sensing channel is adjacent to at least one odd sensing channel and not adjacent to any other even sensing channel,
  wherein the signal processing circuit is configured such that, when the distortion detection unit determines that distortion due to noise has occurred, the signal processing circuit operates in a distortion mode,
  wherein the signal processing circuit is configured such that, when the distortion detection unit does not determine that distortion due to noise has occurred, the signal processing circuit operates in a normal mode,
  wherein a sensing channel in an off state is disconnected from its respective sensing line, and
  wherein, in the distortion mode, the control unit operates:
    the channel switches to either turn an odd sensing channel to the off state while no even sensing channel is in the off state or turn an even sensing channel to the off state while no odd sensing channel is in the off state; and
    the distortion mode switches to connect in parallel the feedback capacitor of the sensing channel in the off state to the feedback capacitor of an adjacent sensing channel;
  determining, by the distortion detection unit, whether noise is present based on the output voltages of the sensing channels; and
  if a noise voltage is present, operating in the distortion mode to detect a touch on the touch screen panel; and
  if a noise voltage is not present, operating in the normal mode to detect a touch on the touch screen panel.

10. The method according to claim 9, wherein, in the distortion mode, the control unit operates:
  the channel switches to either turn all odd sensing channels to the off state while no even channels are in the off state or turn all even sensing channels to the off state while no odd sensing channels are in the off state, and
  the distortion mode switches to connect in parallel the feedback capacitor of each sensing channel in an off state to the feedback capacitor of an adjacent sensing channel.

11. The method according to claim 9, wherein in the normal mode, the control unit operates:
  the channel switches such that no sensing channel is in the off state, and
  the distortion mode switches such that the feedback capacitor of each sensing channel is disconnected from all adjacent sensing channels.

12. The method according to claim 9, wherein the first sensing channel comprises a first operational amplifier, which is connected in parallel to the feedback capacitor of the first sensing channel in the normal mode,
  wherein the second sensing channel comprises a second operational amplifier, which is connected in parallel to the feedback capacitor of the second sensing channel in the normal mode; and
  wherein, in the distortion mode, the control unit operates the distortion mode switches such that the feedback capacitor of the first sensing channel is connected in parallel to the feedback capacitor of the second sensing channel.

13. The method according to claim 12,
  wherein, when the first sensing channel is in the off state, the feedback capacitor of the first sensing channel is disconnected from the first operational amplifier; and
  wherein, when the second sensing channel is in off state, the feedback capacitor of the second sensing channel is disconnected from the second operational amplifier.

14. The method according to claim 9, wherein, in the distortion mode, either the first sensing channel or the second sensing channel is in the off state while the other is not in the off state.

15. The method according to claim 9, wherein each sensing channel comprises an operational amplifier, which is connected in parallel to the feedback capacitor of its respective sensing channel in the normal mode.

16. The method according to claim 15, wherein, when a sensing channel is in the off state, the feedback capacitor of that sensing channel in the off state is disconnected from the operational amplifier of that sensing channel in the off state.

* * * * *